(12) United States Patent
Martin

(10) Patent No.: US 12,548,986 B2
(45) Date of Patent: *Feb. 10, 2026

(54) CABLE CLIPS

(71) Applicant: Hubbell Incorporated, Shelton, CT (US)

(72) Inventor: Evan Ronald Martin, Litchfield, NH (US)

(73) Assignee: Hubbell Incorporated, Shelton, CT (US)

( * ) Notice: Subject to any disclaimer, the term of this patent is extended or adjusted under 35 U.S.C. 154(b) by 71 days.

This patent is subject to a terminal disclaimer.

(21) Appl. No.: 18/484,481

(22) Filed: Oct. 11, 2023

(65) Prior Publication Data
US 2024/0039257 A1 Feb. 1, 2024

Related U.S. Application Data

(63) Continuation of application No. 16/120,543, filed on Sep. 4, 2018, now Pat. No. 11,817,684.

(60) Provisional application No. 62/554,637, filed on Sep. 6, 2017.

(51) Int. Cl.
*H02G 3/04* (2006.01)
*H02G 3/32* (2006.01)

(52) U.S. Cl.
CPC ............ *H02G 3/0456* (2013.01); *H02G 3/32* (2013.01)

(58) Field of Classification Search
CPC .. H02G 3/32; H02G 3/26; H02G 3/00; H02G 3/0456; H02G 3/125; H02G 3/126; F16L 3/13; F16L 3/24; F16L 3/243; H01R 4/64

USPC ..................................... 248/74.2, 72, 228.7
See application file for complete search history.

(56) References Cited

U.S. PATENT DOCUMENTS

| | | |
|---|---|---|
| 942,693 A | 12/1909 | Wintermute |
| 1,332,004 A | 2/1920 | Rawleigh |
| 1,398,519 A | 11/1921 | Hosch |
| 2,061,463 A | 11/1936 | Hall |
| 2,299,674 A | 10/1942 | Austin, Jr. |
| 2,317,825 A | 4/1943 | Teas, Sr. |
| 2,332,855 A | 10/1943 | Jones |
| 2,385,209 A | 9/1945 | Joyce |
| 2,450,147 A | 9/1948 | Lawry |
| 2,618,033 A | 11/1952 | Tinnerman et al. |
| 2,712,917 A | 7/1955 | Flora et al. |
| 2,764,791 A | 10/1956 | Bedford, Jr. |
| 3,003,736 A | 10/1961 | Hofgesang |

(Continued)

FOREIGN PATENT DOCUMENTS

| | | | | |
|---|---|---|---|---|
| CA | 2824260 | | 2/2014 | |
| CA | 2825387 A1 | * | 2/2014 | ............. F16L 3/137 |

(Continued)

OTHER PUBLICATIONS

International Search Report and Written Opinion mailed in corresponding International Application PCT/US2018/049322 on Nov. 15, 2018 (9 pages).

(Continued)

*Primary Examiner* — Taylor Morris
(74) *Attorney, Agent, or Firm* — Wissing Miller LLP

(57) ABSTRACT

A cable clip including a pair of clamp members, a pair of extension members, each extension member extending from a clamp member, and a spanning member spanning from one extension member to the other extension member.

20 Claims, 6 Drawing Sheets

(56) References Cited

U.S. PATENT DOCUMENTS

| | | | |
|---|---|---|---|
| 3,020,602 A | 2/1962 | Siering | |
| 3,049,042 A | 8/1962 | De Lynn | |
| 3,051,424 A * | 8/1962 | Duhamel | F16L 3/11 248/62 |
| 3,122,604 A | 2/1964 | Cook et al. | |
| 3,131,447 A | 5/1964 | Tinnerman | |
| 3,154,276 A | 10/1964 | Havener | |
| 3,180,597 A * | 4/1965 | Havener | F16B 2/246 248/68.1 |
| 3,208,119 A | 9/1965 | Alexander | |
| 3,216,685 A | 11/1965 | Raymond | |
| 3,262,662 A | 7/1966 | Andre | |
| 3,363,864 A | 1/1968 | Olgreen | |
| 3,428,284 A | 2/1969 | Kreuzer et al. | |
| 3,508,730 A | 4/1970 | Knezo, Jr. | |
| 3,528,050 A | 9/1970 | Hindenburg | |
| 3,537,698 A | 11/1970 | Callanan | |
| 3,582,030 A | 6/1971 | Barrett, Jr. | |
| 3,626,553 A | 12/1971 | Darney et al. | |
| 3,730,466 A | 5/1973 | Swanquist | |
| D228,376 S | 9/1973 | Martz et al. | |
| 3,780,209 A | 12/1973 | Schuplin | |
| 3,983,602 A | 10/1976 | Barry | |
| 4,029,384 A | 6/1977 | Reinwall, Jr. | |
| 4,043,527 A | 8/1977 | Franzmeier | |
| 4,087,149 A | 5/1978 | Fischer | |
| 4,140,293 A | 2/1979 | Hansen | |
| 4,353,519 A * | 10/1982 | Bogart | B64C 1/406 248/228.7 |
| 4,406,505 A | 9/1983 | Avramovich | |
| 4,483,453 A | 11/1984 | Smolik | |
| 4,679,754 A | 7/1987 | Richards | |
| 4,875,876 A | 10/1989 | O'Loughlin | |
| 4,971,280 A | 11/1990 | Rinderer | |
| 4,993,959 A * | 2/1991 | Randolph | H01R 4/64 439/865 |
| 5,127,577 A | 7/1992 | Lynch, Jr. et al. | |
| 5,141,185 A | 8/1992 | Rumbold et al. | |
| 5,148,981 A | 9/1992 | Lynch, Jr. et al. | |
| 5,188,318 A | 2/1993 | Newcomer et al. | |
| 5,189,766 A | 3/1993 | Weber | |
| 5,347,691 A | 9/1994 | Terazoe | |
| 5,408,045 A | 4/1995 | Jorgensen et al. | |
| 5,451,167 A | 9/1995 | Zielinski et al. | |
| 5,463,189 A | 10/1995 | Deneke et al. | |
| 5,480,053 A | 1/1996 | Jorgensen | |
| 5,580,014 A | 12/1996 | Rinderer | |
| 5,593,327 A | 1/1997 | Hlinsky et al. | |
| 5,667,177 A | 9/1997 | Van Leeuwen et al. | |
| 5,823,483 A | 10/1998 | Gaskill | |
| 5,902,961 A | 5/1999 | Viklund et al. | |
| 6,005,195 A | 12/1999 | Kam | |
| 6,019,322 A | 2/2000 | Shimizu | |
| 6,073,896 A | 6/2000 | McFadden | |
| 6,106,310 A | 8/2000 | Davis et al. | |
| 6,186,799 B1 | 2/2001 | Mello | |
| 6,234,835 B1 | 5/2001 | Bakker et al. | |
| 6,428,349 B1 | 8/2002 | Dickson et al. | |
| 6,508,441 B1 * | 1/2003 | Kirschner | F16L 3/243 248/62 |
| 6,956,172 B2 | 10/2005 | Dinh | |
| 7,090,174 B2 * | 8/2006 | Korczak | F16B 37/045 248/65 |
| 7,111,707 B2 | 9/2006 | Reeves | |
| 7,152,831 B2 | 12/2006 | Riedy et al. | |
| 7,219,863 B1 | 5/2007 | Collett | |
| 7,360,745 B2 | 4/2008 | Nikayin et al. | |
| 7,398,949 B2 | 7/2008 | Weech et al. | |
| 7,523,897 B2 | 4/2009 | Boltz et al. | |
| 7,544,889 B1 | 6/2009 | Sanchez | |
| 7,607,618 B2 | 10/2009 | Mori et al. | |
| 7,686,625 B1 | 3/2010 | Dyer et al. | |
| 7,717,387 B2 | 5/2010 | Naheem | |
| 7,837,156 B1 * | 11/2010 | Handler | F16L 3/1218 248/339 |
| 8,025,508 B2 | 9/2011 | Parker et al. | |
| 8,523,506 B2 | 9/2013 | MacDonald et al. | |
| 8,590,223 B2 | 11/2013 | Kilgore et al. | |
| 8,770,526 B2 | 7/2014 | Siddiqui et al. | |
| 8,840,071 B2 * | 9/2014 | Oh | F16L 3/1075 248/65 |
| 8,974,245 B2 | 3/2015 | Kovalov | |
| 8,998,660 B2 | 4/2015 | Bakos | |
| 9,010,696 B2 | 4/2015 | Siddiqui et al. | |
| 9,021,667 B2 | 5/2015 | Wasco | |
| 9,086,175 B2 | 7/2015 | Feige | |
| 9,548,598 B2 | 1/2017 | Tally et al. | |
| 9,562,628 B2 | 2/2017 | Nuernberger | |
| 9,671,046 B2 * | 6/2017 | Whipple | F16L 3/233 |
| D806,529 S | 1/2018 | Olenick | |
| 9,903,524 B2 * | 2/2018 | Lange | F16L 59/135 |
| 10,141,662 B2 | 11/2018 | Bernard et al. | |
| 10,253,905 B2 | 4/2019 | Martin | |
| D880,285 S | 4/2020 | Olenick | |
| 10,847,960 B1 | 11/2020 | Naugler et al. | |
| 10,852,038 B2 * | 12/2020 | Rothschild | H02S 30/10 |
| 11,105,443 B2 * | 8/2021 | Wu | F16L 3/02 |
| 12,062,894 B2 * | 8/2024 | Naugler | H02G 3/0456 |
| 2009/0199505 A1 | 8/2009 | Loehlein | |
| 2009/0236477 A1 * | 9/2009 | Oh | H02G 1/04 248/65 |
| 2010/0192334 A1 | 8/2010 | Reichle et al. | |
| 2010/0299891 A1 | 12/2010 | Myers | |
| 2012/0074268 A1 * | 3/2012 | McMath | F16L 3/133 248/58 |
| 2012/0192925 A1 | 8/2012 | Grushowitz et al. | |
| 2014/0061396 A1 | 3/2014 | Magno, Jr. et al. | |
| 2014/0197290 A1 | 7/2014 | Davis | |
| 2015/0214709 A1 | 7/2015 | Landry et al. | |
| 2015/0275578 A1 | 10/2015 | Sylvester et al. | |
| 2016/0116084 A1 | 4/2016 | Wessel | |
| 2016/0308342 A1 | 10/2016 | Witherbee et al. | |
| 2018/0019703 A1 | 1/2018 | Almy et al. | |
| 2018/0073201 A1 | 3/2018 | Mulva | |
| 2019/0323631 A1 * | 10/2019 | Wu | F16L 3/1233 |
| 2021/0057891 A1 | 2/2021 | Johnston et al. | |
| 2021/0222798 A1 | 7/2021 | Cox | |
| 2021/0332912 A1 | 10/2021 | Rohder | |
| 2022/0242336 A1 | 8/2022 | Yasuda | |

FOREIGN PATENT DOCUMENTS

| | | | |
|---|---|---|---|
| DE | 202020105023 U1 * | 10/2020 | H02G 3/36 |
| GB | 2139280 A * | 11/1984 | F16L 3/23 |

OTHER PUBLICATIONS

International Preliminary Report on Patentability mailed in corresponding International Application PCT/US2018/049322 on Mar. 10, 2020 (9 pages).

Examination Report No. 1 from corresponding Australian Application No. 2018328094 mailed Aug. 11, 2023 (4 pages).

Examination Report No. 2 from corresponding Australian Application No. 2018328094 mailed Nov. 28, 2023 (6 pages).

Examination Report No. 3 from corresponding Australian Application No. 2018328094 mailed Jan. 23, 2024 (5 pages).

* cited by examiner

CABLE CLIPS

CROSS-REFERENCE TO RELATED APPLICATIONS

This application is a continuation of co-pending application Ser. No. 16/120,543 filed on Sep. 4, 2018, which claims benefit from U.S. Provisional Patent Application Ser. No. 62/554,637, filed Sep. 6, 2017, the entire contents of each are incorporated herein by reference.

BACKGROUND

Field

The present disclosure relates generally to clips, and more particularly to cable clips used to secure cables to structures.

Description of the Related Art

In recent years, the use of photovoltaic arrays to provide electrical power in commercial, residential, and other environments has become popular. Photovoltaic arrays are generally composed of a number of photovoltaic modules set within a metallic frame and a rail system that supports the photovoltaic modules. The rail system is attached to a support structure such as a roof or the ground. When installing a photovoltaic array, a number of photovoltaic modules are assembled onto the rail system. The metallic frames of the individual photovoltaic modules, and the structural pieces, e.g., the rails, on which the modules mount are generally made out of aluminum. Depending upon the size of the photovoltaic array, the rail system may include multiple metallic rails coupled or connected together in a grid pattern. Like other sources of electrical power, to ensure safety, the metal frames of the photovoltaic modules and the metal rails on which they are secured are often required by national or local electrical codes to be electrically bonded. The electrical cables that bond the frame and rails, and the electrical power cables extending to/from the photovoltaic modules should be neatly and efficiently held in position.

SUMMARY

The present disclosure provides embodiments of cable clips used to hold bonding cables and electrical cables to structures, such as metal rails forming the framework for photovoltaic arrays. In one exemplary embodiment, the cable clip includes a pair of clamp members, a pair of extension members extending from a clamp member and a spanning member spanning from one extension member to the other extension member.

According to another exemplary embodiment, the cable clip includes a first clamp member, a second clamp member, a spanning member, a first extension member and a second extension member. The spanning member has a first end and a second end. The first extension member has a first end extending from the first clamp member and second end extending from the first end of the spanning member. The second extension member has first end extending from the second clamp member and a second end extending from the second end of the spanning member.

In another exemplary embodiment, the cable clip includes a pair of clamp members. Each clamp member includes a first arm, a second arm and a gap. The first arm has a first end connected to a back pad and a lead-in at a second end. The second arm has a first end connected to the back pad, a lead-in at a second end and an extension arm along a side. The gap is between the first and second arms. The gap permits the clamp member to be clamped a structure, such as a rail or frame of a photovoltaic array. The cable clip according to this embodiment also includes a spanning member that extends between the extension arms of each of the pair of clamp members.

In another exemplary embodiment, the cable clip includes a pair of clamp member, a spanning member and a pair of extension arms. Each clamp member includes a first arm, a second arm and a receiving zone. The first arm has a first end connected to a back pad and a lead-in at a second end. The second arm has a first end connected to the back pad and a lead-in at a second end. The receiving zone is between the first and second arms and permits the clamp member to be clamped to a structure. In this exemplary embodiment, a first extension arm of the pair of extension arms extends from the first or second arm of one of the pair of clamp members to the spanning member. A second extension arm of the pair of extension arms extends from the first or second arm of the other of the pair of clamp members to the spanning member.

The present disclosure provides embodiments of methods for attaching cables to a structure. In one exemplary embodiment, the method includes providing a cable clip including a pair of clamp members, extension members extending from the pair of clamp members and a spanning member extending between the extension members. The method also includes sliding one of the pair of clamp members over an edge of the structure, lifting the other of the pair of clamp members up and away from the structure, inserting at least one cable into a gap formed between the structure and the spanning member, pressing the other of the pair of clamp members down and away from the edge of the structure and sliding the other of the pair of clamp members onto the edge of the structure thereby securing the at least one cable to the structure.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
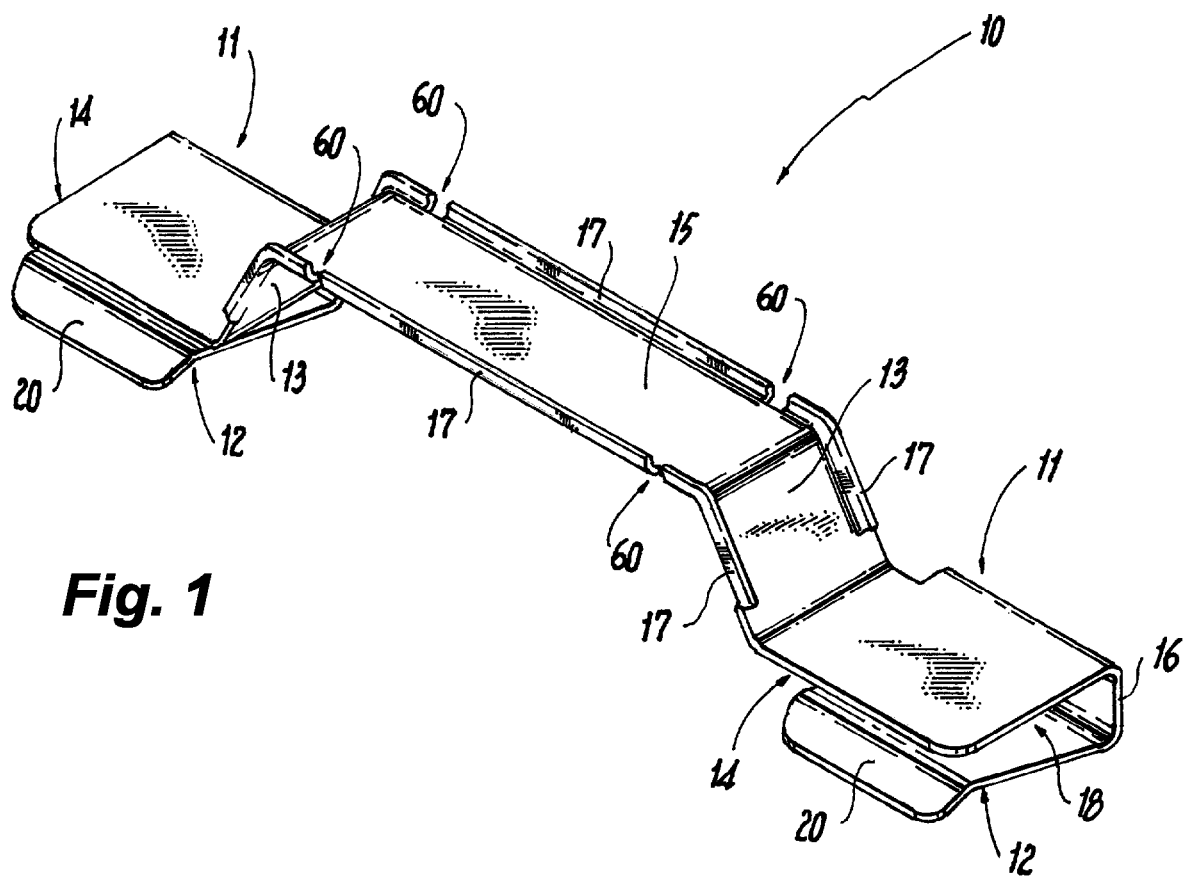
FIG. 1 is a front perspective view of an exemplary embodiment of a cable clip according to the present disclosure.

The present disclosure provides descriptions of exemplary embodiments for cable clips used to secure cables to structures including, for example metal structures, such as metal rails. For example, exemplary embodiments of the present disclosure may be used to secure cables, including electrical bonding cables, electrical power cables, etc. to a framework holding photovoltaic arrays. The cable clips are generally formed of a metal, and can have a unitary, monolithic or multi-part construction. The cable clips are capable of securing one or more cables to structures (e.g., rails or frames of a photovoltaic array). Generally, the structures to which the cable clip can be attached are generally metal, although embodiments of the present disclosure may be utilized on non-metal structures as well. The cable clip may include projections that grip the structure and securely maintain the cable clip and thus the one or more cables in position. The projections may penetrate non-conductive, protective coatings on metal structures to contact the metal to effectively electrically bond the cable clip to the structure. As a non-limiting example, the projections may be tooth-like projections that penetrate non-conductive, protective coatings on the metal structures to contact the metal to effectively electrically bond the cable clip to the structure.

Generally, electrical bonding, electrical bond, and/or electrically bonding are used herein in the technical sense set forth in National Electric Code, Article 250. Generally, electrical bonding, electrical bond and/or electrically bonded are used here in as forming an electrically conductive path between the metal structures to ensure electrical continuity between the metal structures and an electrical supply source sufficient to establish a ground fault current path to safely conduct electrical current imposed on the metal structures.

Referring to FIGS. 1-5, an exemplary embodiment of a cable clip 10 according to the present disclosure is shown. In this exemplary embodiment, the cable clip 10 may be of unitary or monolithic construction or may be separate components secured together by welds, mechanical fasteners or adhesives. Each end of the cable clip 10 includes a clamp member 11 formed into a clamp shape. Each clamp member 11 has opposing arms 12 and 14, joined by a back pad 16. The two opposing arms 12 and 14 and back pad 16 define between them a receiving zone 18, e.g., an elongated channel, seen in FIG. 2, for receiving portions of, for example, rails forming the framework for photovoltaic arrays. Extension arms 13 extend from opposing arms 14 at an angle relative to the arms 14 and are connected via spanning arm 15. Extension arms 13 and/or spanning arm 15 may include upwardly bent edges 17. The upwardly bent edges 17 provide extra rigidity to the extension arms 13 and spanning arm 15 and limit or prevent cables being held by cable clip 10 from contacting any sharp edges on the extension arms 13 and/or spanning arm 15. Notches 60 are formed in the bent edges 17 for providing some flexibility to the cable clip 10, allowing the clamp members 11 to be readily attached to a structure as will be described in more detail below.

Figure 2:
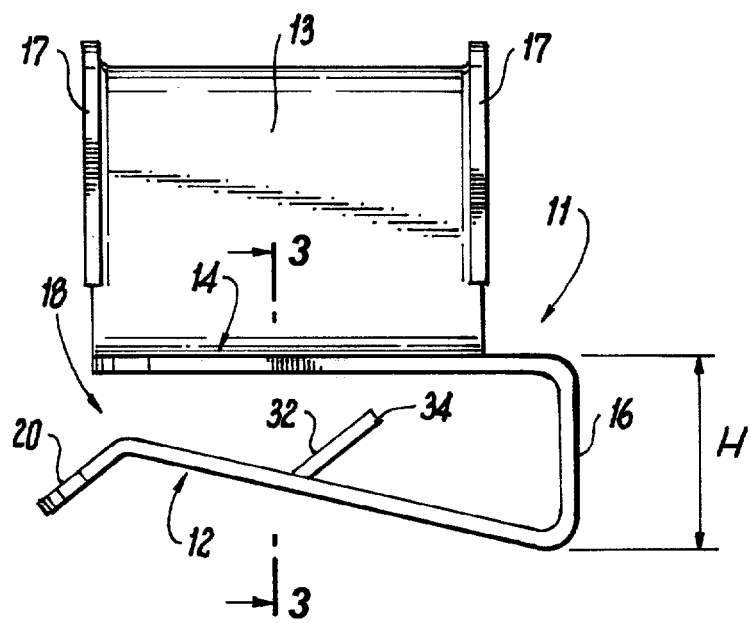
FIG. 2 is an end elevation view of the cable clip of FIG. 1.
Figure 3:
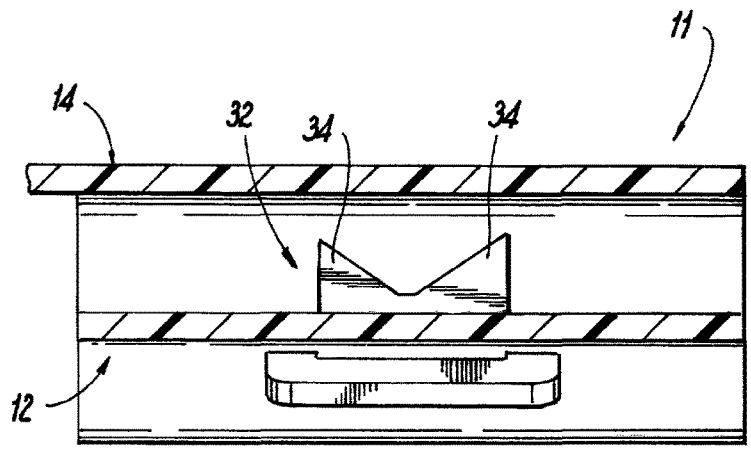
FIG. 3 is a front sectional view of a portion of the cable clip depicted in FIG. 2 taken along the lines 3-3.

As shown in FIG. 2, arm 12 of clamp member 11 has a lead-in 20 which may be a rounded edge or other lead-in that facilitates a smooth entry of the cable clip 10 onto a rail. In the exemplary embodiment depicted in FIG. 2, arm 12 also includes one or more penetrating projections 32 that extend into the receiving zone 18. The one or more penetrating projections 32 may include one or more teeth 34, seen in FIG. 3, that extend into the receiving zone 18 so that the teeth 34 of the penetrating projections 32 can pierce into the structure, e.g., the rails or frames of a photovoltaic arrays. For example, if cable clip 10 is attached to a metal rail, teeth 34 can pierce through non-conductive coatings, e.g., paint or powder coating, on the metal rail inserted between the arms 12 and 14 of a clamp member 11 to contact the metal of the metal rail, and otherwise provide a secure connection of the cable clip 10 to the metal rail. If cable clip 10 is attached to a non-metal structure, teeth 34 can penetrate a surface of the structure and provide a secure connection between the cable clip 10 and structure.

Figure 4:
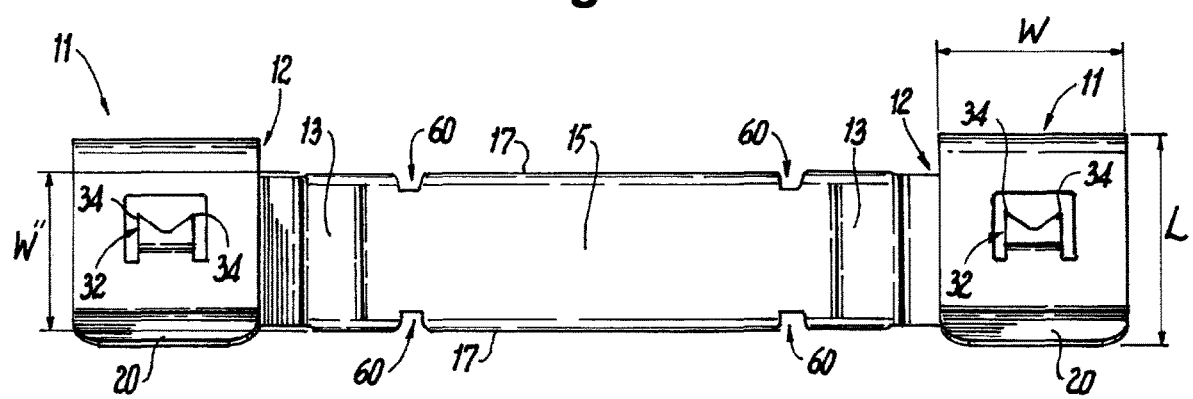
FIG. 4 is bottom plan view of the cable clip of FIG. 1.
Figure 5:
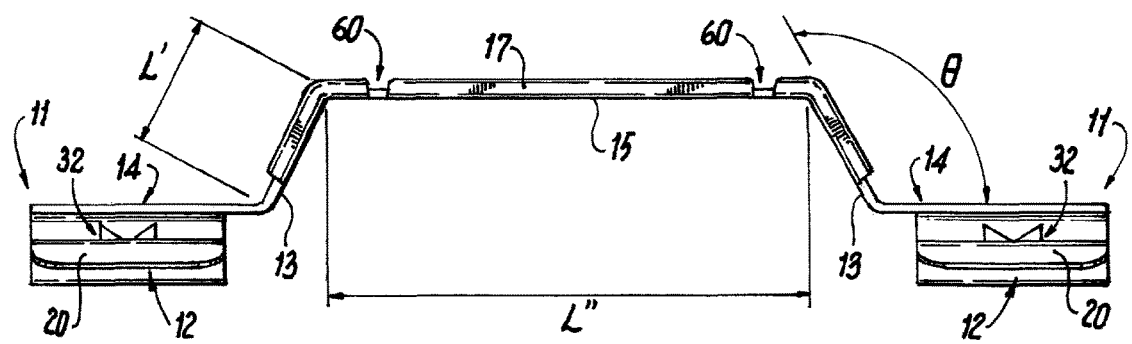
FIG. 5 is a front elevation view of the cable clip of FIG. 1.

Referring to FIGS. 4 and 5, the arms 12 and 14, extension arms 13 and spanning arm 15 can come in many shapes and sizes. For example, arms 12 and 14 may have a width (W) in the range from about 5 mm to about 20 mm, and a length (L) of the arms 12 and 14 can be in the range from about 10 mm to about 30 mm. However, the dimensions for the arms 12 and 14 are provided as examples and are not to be construed as limiting the dimensions of the arms 12 and 14 and thus the cable clip 10. It is also noted that the width (W) and length (L) of the arms 12 and 14 may be the same as shown, or they may differ. The back pad 16 can also come in many shapes and sizes, having for example the same width (W) as the arms 12 and 14, and a height (H), seen in FIG. 2. The height (H) of the back pad 16 may be in the range from about 5 mm to about 20 mm. However, the dimensions for the back pad 16 are provided as examples and are not to be construed as limiting the dimensions of the back pad 16 and thus the cable clip 10. The width (W") of extension arms 13 may be similar to that of arms 12 and 14 and/or spanning arm 15 and may range from about 5 mm to about 30 mm. The length (L') of extension arms 13, seen in FIG. 5, may be about mm to about 30 mm, depending on, for example, the diameter or gauge of the cable to be supported by the cable clip 10. However, the dimensions for the extension arms 13 are provided as examples and are not to be construed as limiting the dimensions of the cable clip 10. It is also noted that the width (W") and length (L') of the extension arms 13 may be the same as shown, or they may differ. The spanning arm 15 may have a length (L") that may depend on a number of factors, including a number cables to be supported by the cable clip 10 and the diameter or gauge of the cables to be supported by the cable clip 10. For example, the length (L") of the spanning arm 15 may range from about 30 mm to about 200 mm. However, these dimensions are provided as examples and are not to be construed as limiting the dimensions of the spanning arm 15 and thus the cable clip 10. As noted above, the extension arms 13 extend from clamp members 11 at an angle (θ) relative to the arm 14, as shown in FIG. 5. The angle (θ) may be approximately 110 degrees. However, angle (θ) may range between 10 degrees and 170 degrees depending on a particular application.

The cable clip 10 according to an embodiment of the present disclosure can be made of a rigid, electrically conductive material. Non-limiting examples of rigid, electrically conductive materials include conductive metals, such as steel, stainless steel, galvanized steel, aluminum or aluminum alloys. According to another exemplary embodiment of the present disclosure, depending on a particular application, the cable clip 10 may be made of a rigid, non-conductive material, such as a plastic including, but not limited to, polyethylene, polypropylene, polystyrene, polyvinyl chloride, etc.

Figure 6:
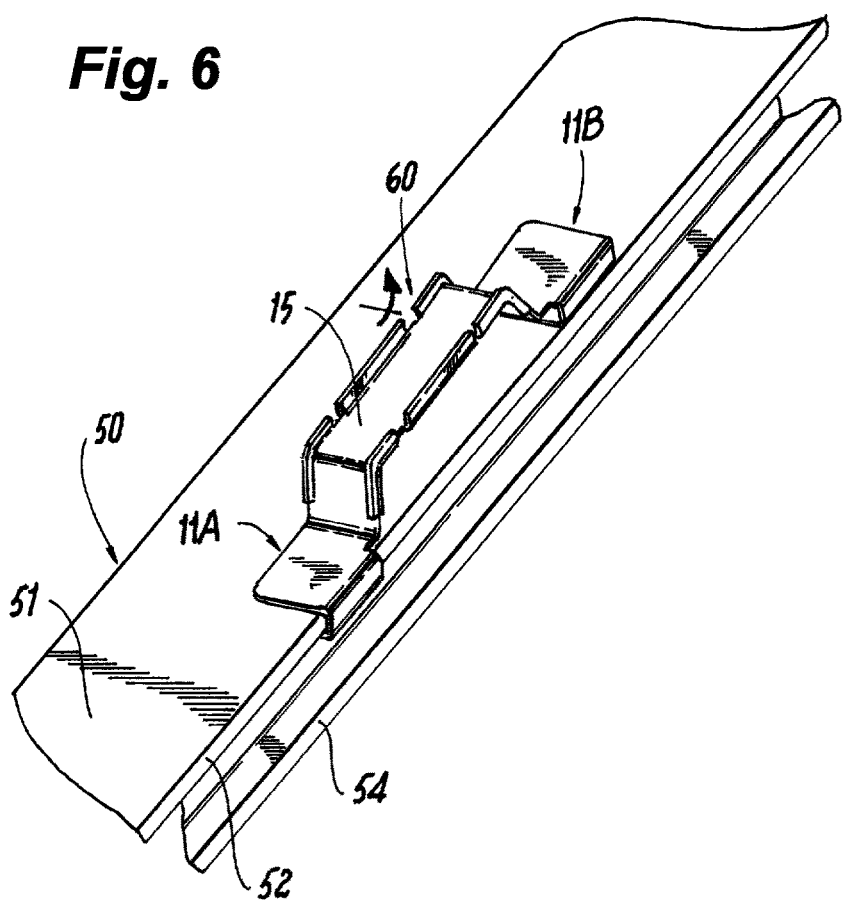
FIGS. 6-9 are perspective views showing exemplary method steps for installing a cable clip according to the present disclosure.
Figure 7:
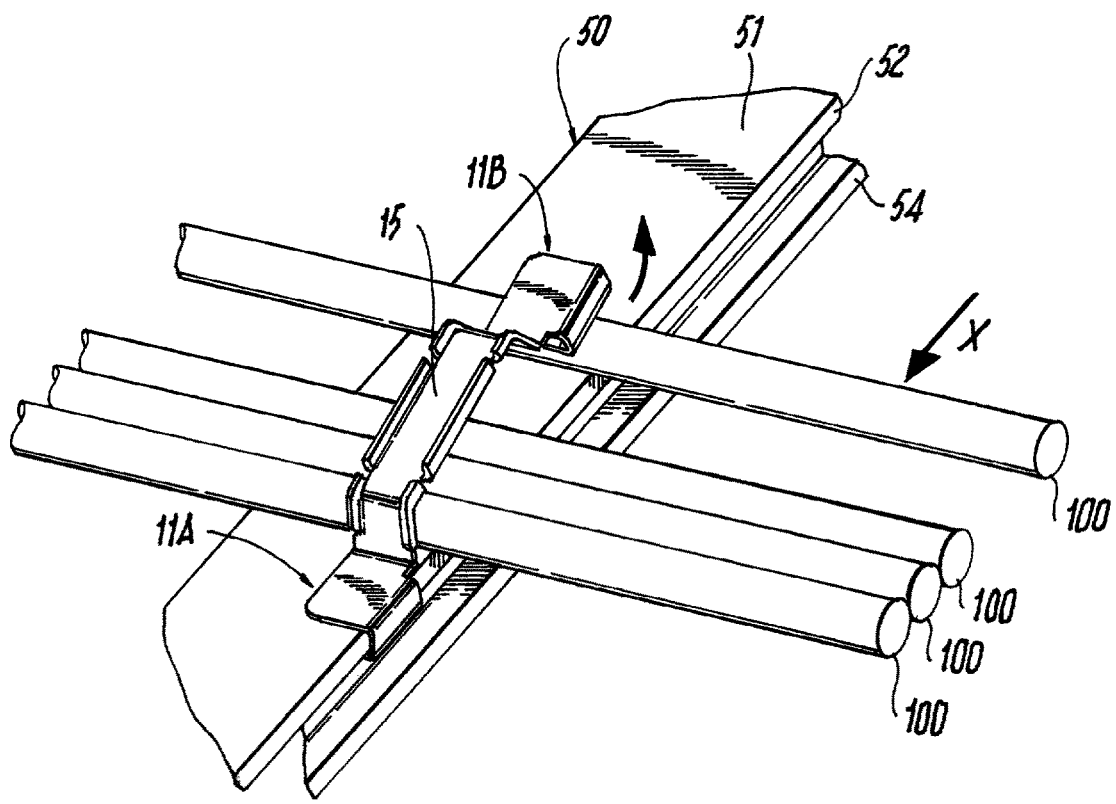
Figure 8:
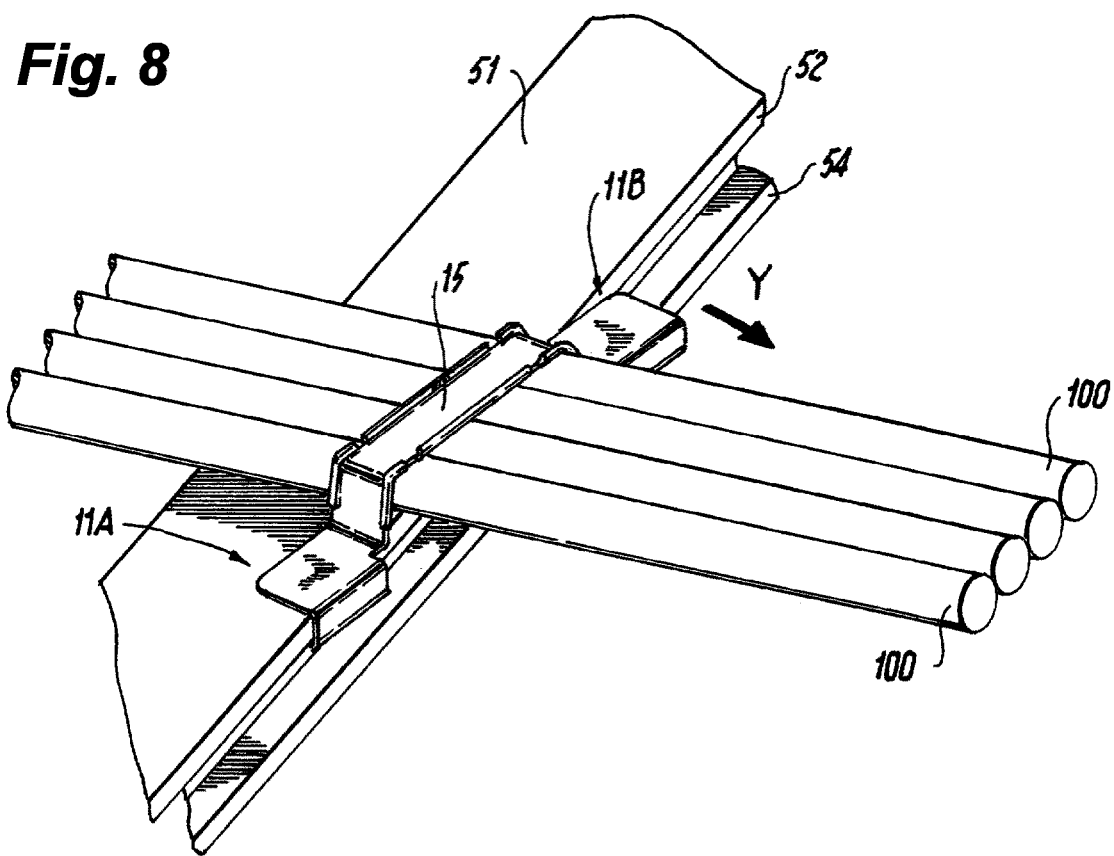
Figure 9:
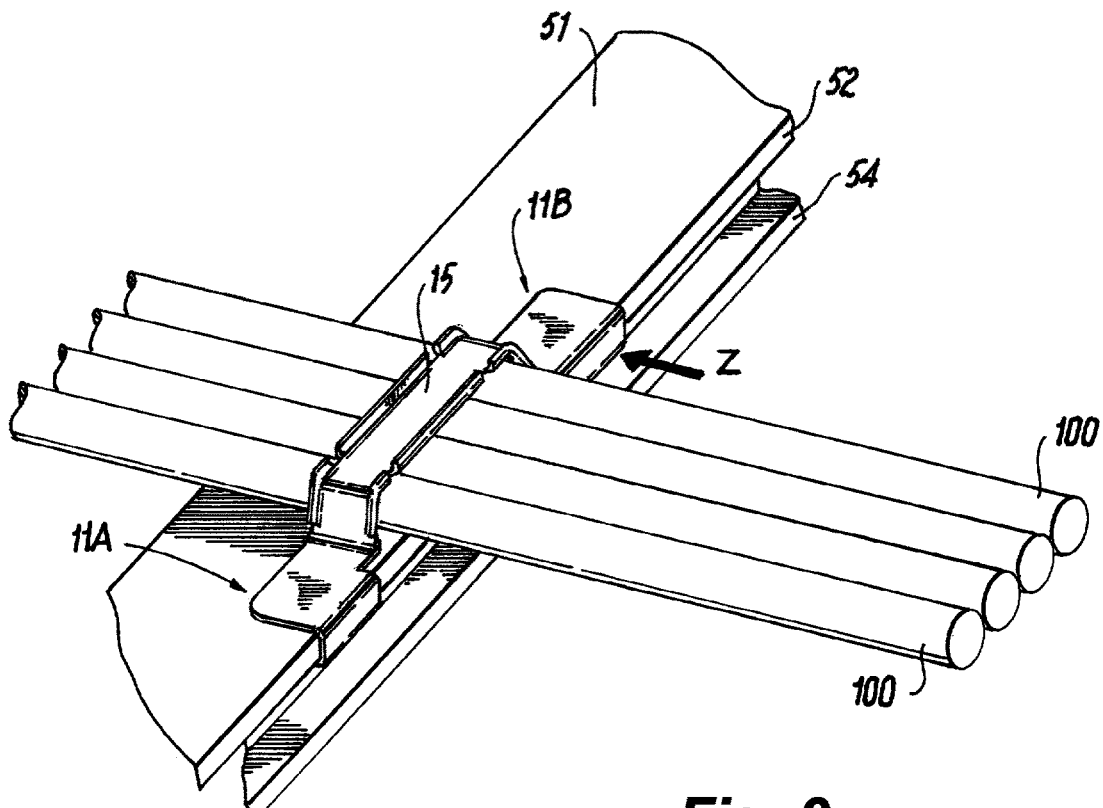

Referring to FIGS. 6-8, a description of a cable clip 10 being attached to an exemplary rail system for photovoltaic arrays is provided. The rail system or structure 50 may include a plurality of elongated rails 51 that come in predefined lengths and are mounted on a support surface such as, for example, a roof or the ground and generally in a grid pattern. Rail 51 generally includes a pair of opposed lips 52, 54 extending from one or more sides thereof. A cable clip 10 according to the present disclosure is attached to the rail 51 by sliding one clamp member 11, e.g., clamp member 11A, of the cable clip 10 over lip 52 of the rail 51, as shown in FIG. 6. The one or more penetrating projections 32 extending into the receiving zone 18 of clamp member 11A engage the rail 51 to effectively hold the clamp member 11A in position on the rail 51. Cables 100 can then be placed under spanning arm 15 by lifting clamp member 11B up and away from rail 51, as shown in FIG. 7, and sliding cables 100 into cable clip 10 in, for example, direction (X). The notches 60, seen in FIG. 1, allow the cable clip 10 to be readily lifted away from the rail 51. After cables 100 are properly positioned between the rail 51 and the cable clip 10, clamp member 11B is pressed down and away from rail 51 in the direction (Y), as shown in FIG. 8. The one or more penetrating projections 32 in the clamp member 11A allow the cable clip 10 to pivot on rail 51, as shown in FIG. 8, while maintaining a hold on the rail 51. The clamp member 11B is then pushed in the direction (Z) over lip 52 to secure the cable clip 10 and cables 100 in position on rail 51, as shown in FIG. 9. The one or more penetrating projections 32 extending into the receiving zone 18 of clamp member 11B engage the rail 51 to effectively hold the clamp member 11B in position on the rail 51.

Figure 10:
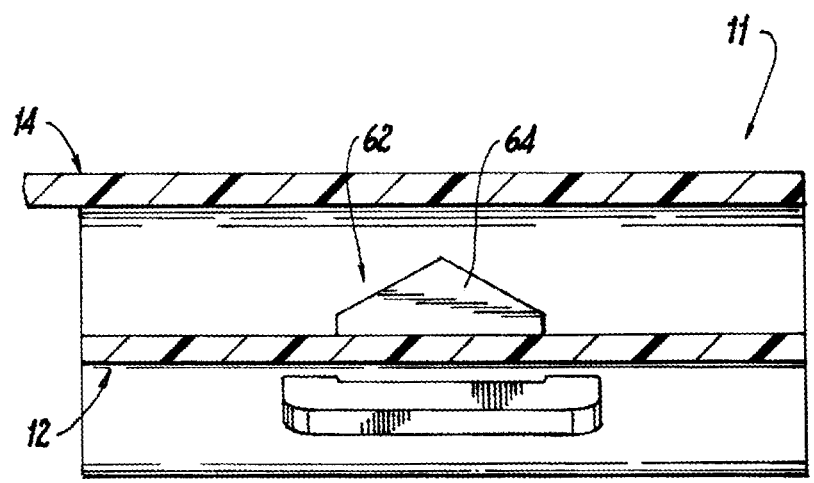
FIG. 10 is a front sectional view of a portion of a cable clip of FIG. 1 depicting another exemplary embodiment of a penetrating projection incorporated into the cable clip.
Figure 11:
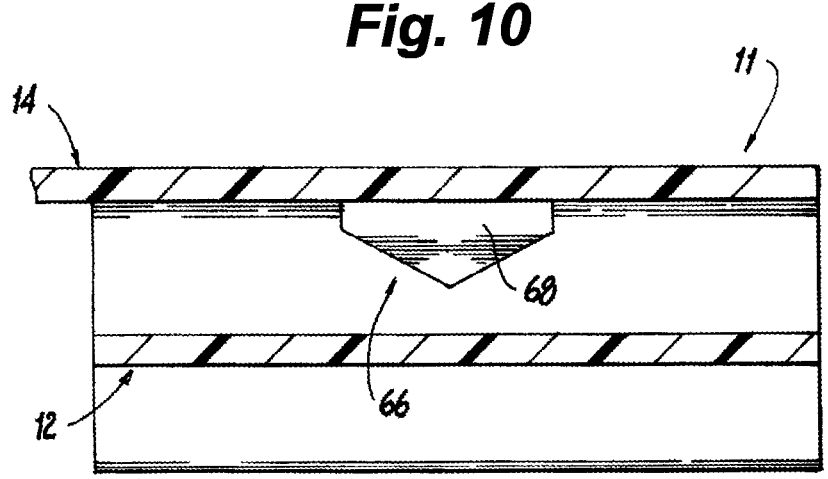
FIG. 11 is a front sectional view of a portion of a cable clip of FIG. 1 depicting another exemplary embodiment of a penetrating projection incorporated into the cable clip.
Figure 12:
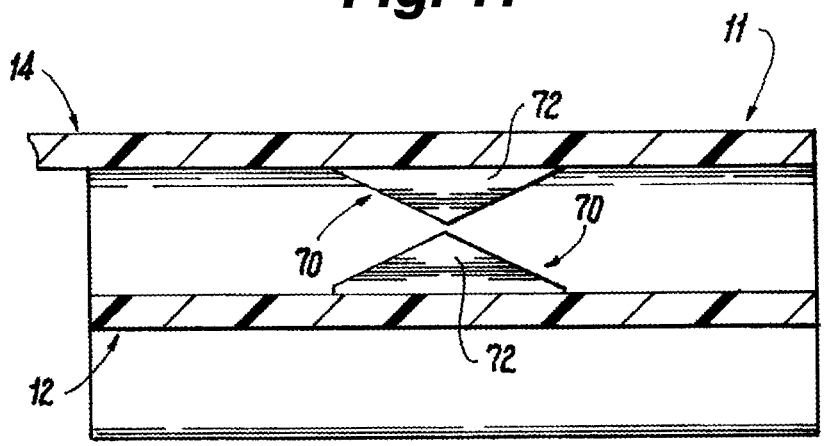
FIG. 12 is a front sectional view of a portion of a cable clip of FIG. 1 depicting another exemplary embodiment of a penetrating projection incorporated into the cable clip.

Turning to FIGS. 10-12, additional exemplary embodiments of the present disclosure are shown, where the one or more penetrating projections extending into the receiving zone 18 of the clamp members 11 may take other configurations. For example, as shown in FIG. 10, one or more penetrating projections 62 may include one tooth-like member 64. Alternatively, one or more penetrating projections 66 may include one tooth-like member 68 and may extend from arm 14 of clamp member 11 instead of arm 12, as shown in FIG. 11. However, the present disclosure contemplates that the one or more penetrating projections 64 and/or 66 may include two or more tooth-like members. According to another exemplary embodiment of the present disclosure, one or more penetrating projections 70 may include one tooth-like projection 72 and may extend from both arm 12 and arm 14 of clamp member 11, as shown in FIG. 12. However, the present disclosure contemplates that the one or more penetrating projections 70 may include two or more tooth-like members.

Figure 13:
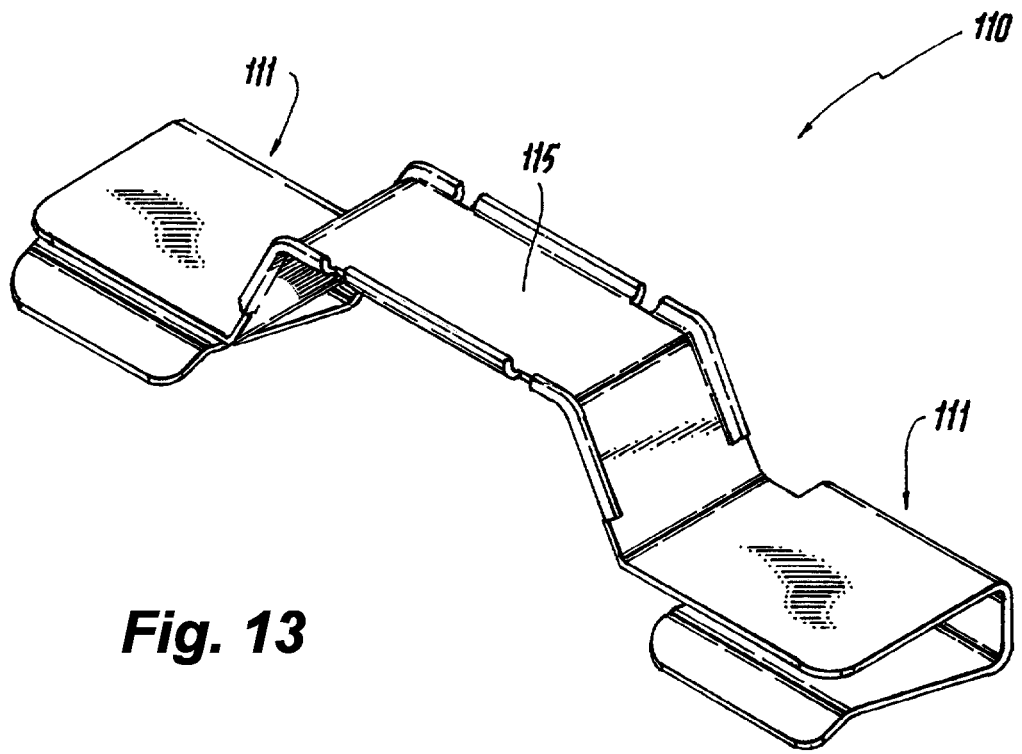
FIG. 13 is a front perspective view of a differently dimensioned cable clip according to the present disclosure.
Figure 14:
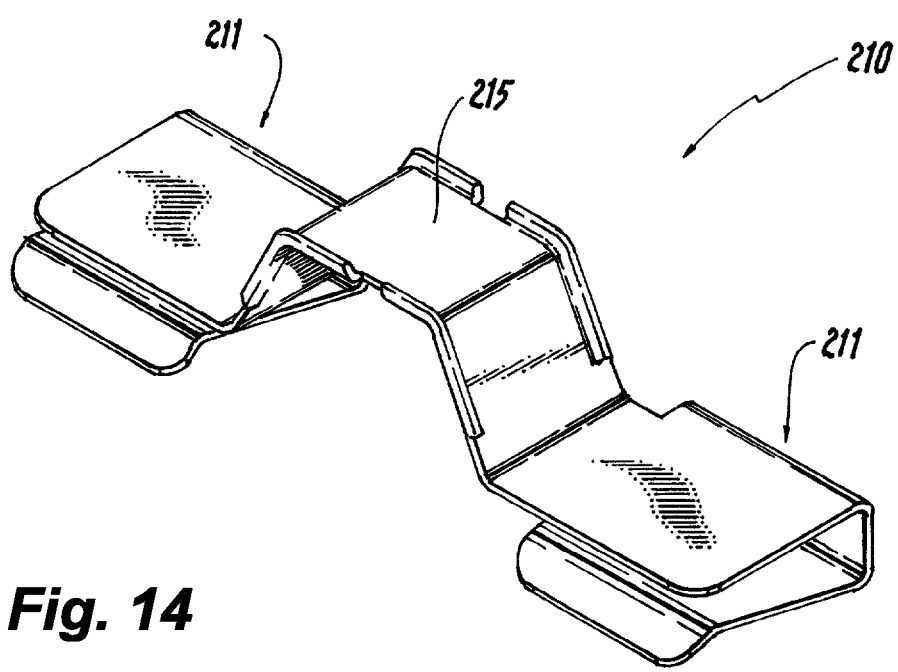
FIG. 14 is a front perspective view of another differently dimensioned cable clip according to the present disclosure.

Turning to FIGS. 13 and 14, the cable clips according to the present disclosure may come in various dimensions, as noted above, for supporting or holding different numbers of cables and/or different gauge of cables. As shown in FIG. 13, the spanning arm 115 of cable clip 110 is shorter than that the spanning arm 15 depicted in FIG. 1 and will generally support or hold fewer cables. As depicted in FIG. 14, spanning arm 215 of cable clip 210 is shorter than that the spanning arm 115 depicted in FIG. 13 and will generally support or hold even fewer cables.

While illustrative configurations of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A cable clip for holding electrical wires to a structure, the cable clip comprising:
    a first clamp member including a pair of opposing arms, each opposing arm having a first end and a second end, wherein the first ends are connected to a back pad such that a receiving zone is formed between the pair of opposing arms;
    a second clamp member including a pair of opposing arms, each opposing arm having a first end and a second end, wherein the first ends are connected to a back pad such that a receiving zone is formed between the pair of opposing arms;
    a spanning member having a first end and a second end;
    a first extension member having a first end extending from the first clamp member and second end extending from the first end of the spanning member; and
    a second extension member having first end extending from the second clamp member and a second end extending from the second end of the spanning member, wherein edges of the spanning member are bent outwardly providing added rigidity and wherein at least one notch is provided in the outwardly bent edges of the spanning member providing added flexibility.

2. The cable clip according to claim 1, further comprising at least one penetrating projection extending from at least one of the opposing arms of at least one of the clamp members into the receiving zone.

3. The cable clip according to claim 2, wherein the at least one penetrating projection comprises a tooth having a pointed end.

4. The cable clip according to claim 1, further comprising at least one penetrating projection extending from at least one of the opposing arms of the first clamp member, and further comprising at least one penetrating projection extending into the receiving zone of the second clamp member.

5. The cable clip according to claim 4, wherein the at least one penetrating projection extending into the receiving zone of the first clamp member comprises a tooth having a pointed end, and wherein the at least one penetrating projection extending into the receiving zone of the second clamp member comprises a tooth having a pointed end.

6. The cable clip according to claim 1, wherein the first and second clamp members, the first and second extension members and the spanning member are made of an electrically conductive material.

7. The cable clip according to claim 1, wherein edges of the extension members are bent outwardly.

8. A cable clip for holding electrical wires to a structure, the cable clip comprising:
    a first clamp member including a pair of opposing arms, each opposing arm having a first end and a second end, wherein the first ends are connected to a back pad such that a receiving zone is formed between the pair of opposing arms, and wherein at least one of the opposing arms has at least one penetrating projection extending into the receiving zone;
    a second clamp member including a pair of opposing arms, each opposing arm having a first end and a second end, wherein the first ends are connected to a back pad such that a receiving zone is formed between the pair of opposing arms, and wherein at least one of the opposing arms has at least one penetrating projection extending into the receiving zone;
a spanning member having a first end and a second end;
a first extension member having a first end extending from the first clamp member and second end extending from the first end of the spanning member; and
a second extension member having first end extending from the second clamp member and a second end extending from the second end of the spanning member, wherein edges of the spanning member are bent outwardly providing added rigidity and wherein at least one notch is provided in the outwardly bent edges of the spanning member providing added flexibility.

9. The cable clip according to claim 8, wherein the at least one penetrating projection extending into the receiving zone of the first clamp member comprises a tooth having a pointed end, and the at least one penetrating projection extending into the receiving zone of the second clamp member comprises a tooth having a pointed end.

10. The cable clip according to claim 8, wherein the at least one penetrating projection extending into the receiving zone of the first clamp member comprises a plurality of penetrating projections extending into the receiving zone of the first clamp member, and wherein the at least one penetrating projection extending into the receiving zone of the second clamp member comprises a plurality of penetrating projections extending into the receiving zone of the second clamp member.

11. The cable clip according to claim 10, wherein each of the plurality of penetrating projections extending into the receiving zone of the first clamp member comprises a tooth having a pointed end, and wherein each of the plurality of penetrating projections extending into the receiving zone of the second clamp member comprises a tooth having a pointed end.

12. The cable clip according to claim 8, wherein the first and second clamp members, the first and second extension members and the spanning member are made of an electrically conductive material.

13. The cable clip according to claim 8, wherein edges of the extension members are bent outwardly.

14. A cable clip comprising:
a pair of clamp members, each clamp member comprising:
a first arm having a first end connected to a back pad, a second end and an extension arm extending from a side of the first arm;
a second arm having a first end connected to the back pad and a second end;
a gap between the first and second arms permitting the clamp member to be clamped to a structure; and
at least one penetrating projection extending from at least one of the first arm and the second arm into the gap; and
a spanning member extending between the extension arms, wherein edges of the spanning member are bent outwardly providing added rigidity and wherein at least one notch is provided in the outwardly bent edges of the spanning member providing added flexibility.

15. The cable clip according to claim 14, wherein the first arm and the second arm of each of the pair of clamp members and the spanning member are made of an electrically conductive material.

16. The cable clip according to claim 14, wherein the at least one penetrating projection comprises a tooth having a pointed end.

17. The cable clip according to claim 14, wherein the at least one penetrating projection comprises a plurality of penetrating projections.

18. The cable clip according to claim 17, wherein each of the plurality of penetrating projections comprises a tooth having a pointed end.

19. The cable clip according to claim 14, wherein the second end of the second arm includes a lead-in.

20. The cable clip according to claim 19, wherein each lead-in comprises an outwardly rounded edge.

* * * * *